United States Patent Office 3,513,871
Patented May 26, 1970

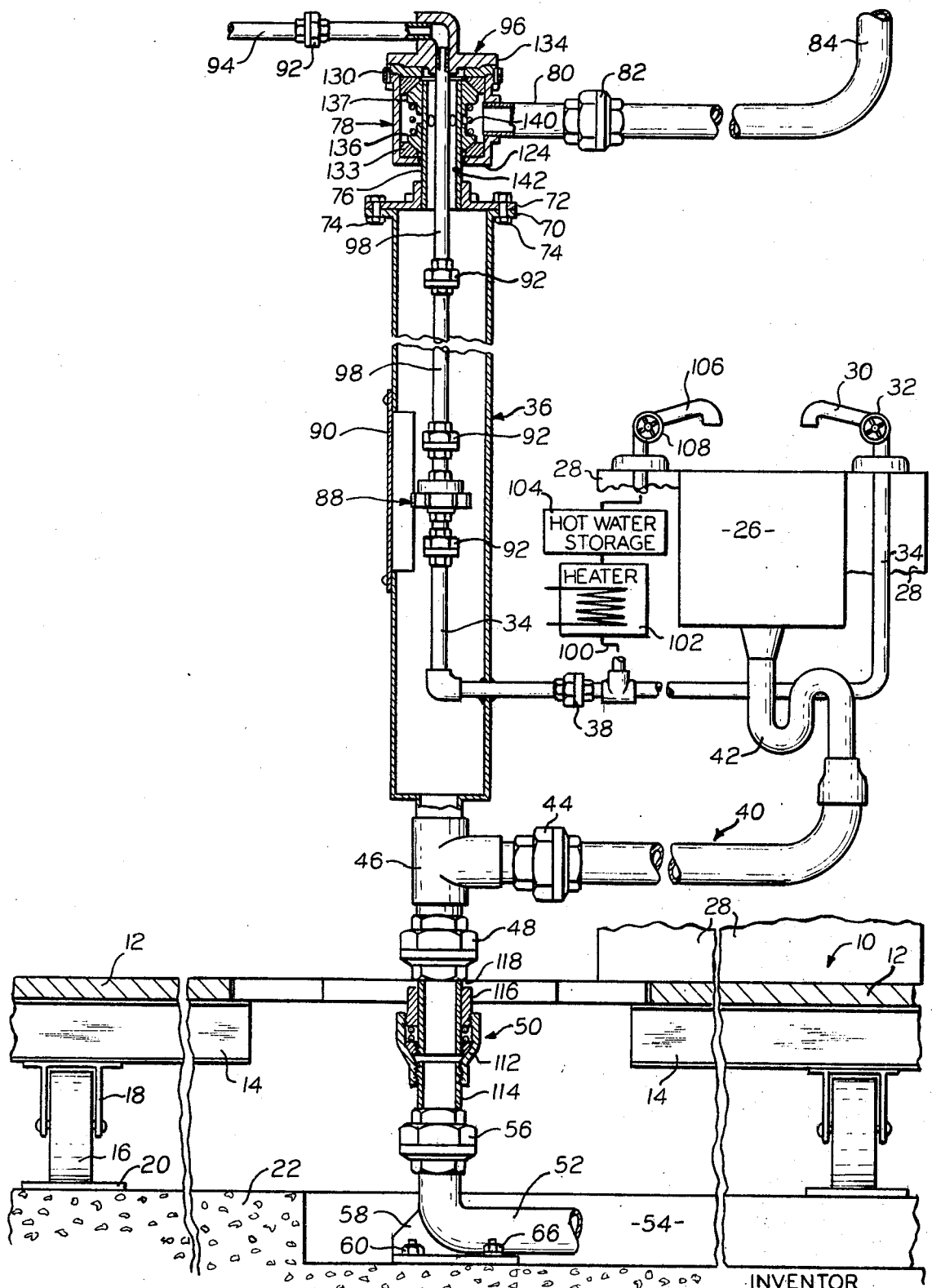

3,513,871
TRIPLE SWIVEL JOINT
David Bruce Johnston, 132 Skyline Lane,
Stamford, Conn. 06903
Filed Oct. 10, 1967, Ser. No. 676,994
Int. Cl. F16l 27/08, 53/00
U.S. Cl. 137—334                    12 Claims

ABSTRACT OF THE DISCLOSURE

This specification discloses a swivel-joint system for connecting pipes on a turntable with stationary pipes. There are at least three swivel pipe joints in axial alignment and the system is constructed with a drain outlet from plumbing on the turntable communicating with stationary piping by means of one of the swivel pipe joints located at the bottom of the system. This drain outlet communicates with a ventilating stack through another swivel pipe outlet located at the top of the system and in axial alignment with the drain outlet. The system also includes a water supply pipe which is led along the center axis of the stack swivel joint and which has its own swivel joint in alignment with the other swivel joints of the system. The construction requires that the ventilating passage to the stack be of generally annular cross section where it surrounds the water supply pipe, and the same principle can be employed to introduce additional pipes into the system, as where it might be necessary to have both hot and cold water supplies.

SUMMARY OF THE INVENTION

One of the problems encountered in the construction of rotating buildings and rotating restaurants has been the connection of plumbing on the rotating structure with stationary piping leading to and from the structure. This invention provides a simple and practical swivel joint system for connecting plumbing on a turntable with stationary piping. It will be illustrated as applied to a triple swivel joint system but it will be understood that the principle of the invention can be used for more than three swivel joints. The preferred construction provides for a water supply, a ventilating stack, and a drain outlet for plumbing on the turntable. The drain outlet and the ventilating stack passage are preferably in alignment at opposite ends of the swivel joint system, and in communication with each other. The water supply is brought through one of the other swivel joints, preferably the ventilating stack joint, and is provided with its own swivel connection at an appropriate location in axial alignment with the other swivel connections.

Other objects, features and advantages of the invention will appear or be pointed out as the description proceeds.

BRIEF DESCRIPTION OF THE DRAWING

The drawing is a diagrammatic view, mostly in section, showing a portion of a turntable and showing plumbing carried by the turntable with pipes that rotate with the turntable connected with stationary pipes by the swivel joint system of this invention.

DETAILED DESCRIPTION OF THE INVENTION

A turntable 10 has an annular floor 12 supported by a frame 14. There are rollers 16 connected with the frame 14 by brackets 18 and these rollers 16 travel around a circular track 20 on a stationary base 22.

A basin 26 is carried by the turntable 10 and is supported from the turntable by a support 28. A faucet 30 extends over the basin 26 and has a handle 32 for operating a valve that opens and closes the faucet. The faucet 30 is supported by the same support 28, and it is supplied with water through piping 34 leading to a center column 36. In the construction illustrated, the piping 34 includes a union 38.

The basin 26, together with the faucet 30, piping 34 and its drain, which will be described, are merely representative of plumbing located on the turntable 10.

The basin 26 has a drain 40 which includes a conventional trap 42 and a union 44. The drain connects with a T fitting 46 which is part of the lower end of the column 36. The lower end of the column 36 is connected by a union 48 to a bottom swivel joint 50.

This bottom swivel joint 50 connects the lower end of the column 36 to a stationary drain pipe 52 located in a channel 54 in the base 22. There is preferably another union 56 between the swivel joint 50 and the stationary drain pipe 52. The drain pipe 52 has a bracket 58 resting on the bottom of the channel 54 and this bracket 58 supports the weight of the column 36 and a part of the weight of the piping which connects with the column 36. The bracket 58 and the portion of the base 22 below it provides a fixed foundation for the swivel joint system. It is important that the swivel joint system have its axis coincident with the axis of the turntable 10, and anchor bolts 60 in the base 22 hold the bracket 58 at a fixed location so that the axis of the column 36 and its connected swivel joints remain substantially coincident with the axis of rotation of the turntable 10.

At its upper end, the column 36 has a flange 70. A cover 72 is attached to the flange 70 by a circle of bolts 74. A pipe 76 is secured to a hub of the cover 72, and this pipe 76 is part of an upper swivel joint 78 which connects with a ventilating stack outlet 80. The stack outlet 80 preferably has a union 82 and an upwardly extending part 84 which is connected with stationary structure of the building in which the turntable is located.

The piping 34, which supplies water to the faucet 30, leads to a swivel joint 88 located in the column 36 and accessible through an opening in the column 36. A cover 90 closes the opening through which the swivel joint 88 is accessible. The piping 34 is connected with the swivel joint 88 by a union 92. Water is supplied to the swivel joint 88 from a supply line 94 connected to a stationary fitting 96 at the top of the swivel joint 78, and a stationary supply pipe 98 leads downward from the fitting 96 through the pipe 76 to the upper end of the swivel joint 88. There are other unions 92 at various locations along the water passage provided by the supply pipes 94 and 98.

Although turntables are restrained against transverse movement, some small amount of such movement occasionally occurs, the manufacturing tolerances sometimes locate the axis of rotation of the turntable slightly eccentric of the axis of the column 36 and its swivel joints. To compensate for such eccentricity, the piping 34 and the drain 40 have a portion of their length extending parallel to the axes of the turntable and the swivel joint system, or at least extend in directions that have components which are parallel to these axes. This permits necessary yielding of the piping to accommodate such eccentricity as occurs as a result of transverse movement of the turntable or manufacturing tolerances in the installation of the turntable and the swivel joint system.

In those parts of the system where the water supply piping 34 and 98 are concentric with the vent passage in the column 36 and pipe 76, the cross-section of the vent passage is annular; and the outside diameter of the vent passage is made large enough to obtain the desired total cross section after allowance for the water supply piping at the center.

The drain, vent and water supply provided by this invention supplies all of the piping likely to be needed for any turntable, no matter how much plumbing it may contain. For hot water for the basin 26, a branch 100 is led off from the water supply piping 34 to an electric heater 102 and a water storage tank 104 from which the hot water flows to a faucet 106 which has a valve 108 similar to the faucet 30 and valve 32. Electric power for the heater 102 is supplied to the turntable through conventional slip rings, and this is much simpler than providing a fourth swivel joint for bringing hot water to the turntable from a stationary heater at a location not on the turntable.

The swivel joint 50 has an outer stationary housing 112 connected by a nipple 114 with the union 56. A bushing 116 threads into the upper end of the outer housing 112. A rotatable pipe 118, which connects with the union 48, extends through the bushing 116 and the bushing provides a bearing for the rotatable pipe 118.

At the lower end of the pipe 118, there is a seat element 120, which may be of one-piece construction with the pipe 118; and this seat element 120 has a tapered bottom face which seats against a complementary tapered face in the outer housing 112 to provide a rotary seal for the drain. Ordinarily, no packing rings need be used because the fluid in the drain is not under any substantial pressure.

The swivel joint 78 includes an outer housing 124 which is stationary and to which the vent outlet 80 is connected. There is a flange 126 around the top of the outer housing 124. The fitting 96 provides a cover for the housing 124 and is connected to the flange 126 by a circle of fastenings 128 with a gasket 130 between the cover and the flange. The water supply line 94 threads into a side opening of the fitting 96, and the supply pipe 98 threads into a bottom center opening of the fitting 96.

Within the housing 124 there are lower and upper stationary seats 133 and 134, respectively. There are rotatable seat elements 136 and 137 on the pipe 76. The lower seat element 136 contacts with the stationary seat 133; and the upper seat element 137 contacts with the seat 134. The seat elements 136 and 137 slide axially on the pipe 76 but rotate as a unit with it. A helical compression spring 140 is compressed between the rotary seat elements 136 and 137 for holding these seat elements against their respective seats 133 and 134 with sufficient force to prevent leakage of gas from the vent passage 36.

There are angularly spaced radial openings 142 in the pipe 76 for establishing communication between the interior of the pipe 76 and the surrounding chamber of the housing 124 which communicates with the vent outlet 80.

The swivel joint 88 may be similar to that of the swivel joint 50, already described, or may be of any conventional swivel joint construction which is capable of withstanding the pressure of the water from the supply line 94.

What is claimed is:

1. A swivel joint system including, in combination, a center rotatable structure having three conduits therein and rotatable therewith, each of which conduits has a portion of its length in axial alignment with the other conduits, at least one of the conduits being of generally annular cross section and surrounding one of the other conduits where it is in axial alignment with the third conduit, branch conduits leading away from at least one of the axially aligned rotatable conduits in a direction having a component extending radially from the axis of alignment, said branch conduit being rotatable as a unit with the aligned rotatable conduit from which it extends, stationary conduits in alignment with the respective aligned rotatable conduits, and a swivel joint connecting each of the aligned rotatable conduits with its corresponding stationary conduit.

2. The swivel joint system described in claim 1 characterized by one of the aligned conduits of the rotatable structure being at one end of the system and the other two aligned conduits of the rotatable structure being at the other end of the system and swivel joints of the system in series with one another.

3. The swivel joint system described in claim 2 characterized by two of the aligned conduits of the rotatable system at different ends thereof being in communication with one another in the rotatable system, the stationary conduit with which one of the communicating rotatable conduits connects being a drain pipe, and the stationary conduit with which the other of said communicating rotatable conduits connects being a stack.

4. The swivel joint system described in claim 1 characterized by one of the stationary conduits being a drain, another of said stationary conduits being a vent, and a third of the stationary conduits being a water supply line.

5. The swivel joint system described in claim 4 characterized by the rotatable portion of the conduit which connects with the water supply line dividing into two branches, a cold water faucet to which one branch is connected, a hot water faucet to which the other branch is connected, and a heater and water storage tank located in the branch leading to the hot water faucet.

6. The swivel joint system described in claim 1 combined with a turntable which rotates about an axis, the axis of rotation of the turntable being in substantial alignment with the axis of the swivel joint system, and means on the turntable to which the conduits of the rotatable structure are connected.

7. The combination described in claim 6 characterized by the turntable having a center opening and at least one of the conduits from the swivel joint system extending downwardly through the center opening of the turntable and to a location under the turntable.

8. The swivel joint system described in claim 6 characterized by conduits of the rotatable structure extending outwardly with radial components across the turntable and having portions extending in directions having components parallel to the alignment axis of the swivel joint system and capable of some flexing movement to compensate for any eccentricity between the alignment axis of the swivel joint system and the axis of rotation about which the turntable rotates.

9. The swivel joint system described in claim 1 characterized by a center housing, one of the swivel joints being adjacent to the upper end of the housing and another of the swivel joints being located below the lower end of the housing, and a third of the swivel joints being located within the housing.

10. The swivel joint system described in claim 9 characterized by an opening in the housing for access to the swivel joint within the housing, and a removable cover on the housing for closing said opening.

11. The swivel joint system described in claim 6 characterized by a foundation under the swivel joint system and on the axis of rotation of the turntable and with the bottom swivel joint transmitting at least the greater part of the weight of the system to said foundation.

12. The swivel joint system described in claim 6 characterized by plumbing equipment carried by the turntable, the three conduits of the center rotatable structure having different branch conduits including a drain, a vent, and a water supply line, said branch conduits communicating with the plumbing equipment on the turntable and providing a drain, vent, and water supply line, respectively, for said plumbing equipment.

References Cited

UNITED STATES PATENTS

| 2,131,901 | 10/1938 | Parkton | 137—583 |
| 2,563,531 | 8/1951 | Kirkman | 137—580 |

ALAN COHAN, Primary Examiner

H. M. COHN, Assistant Examiner

U.S. Cl. X.R.

52—34, 65; 137—615; 285—168, 190